J. O. LUTHY.
SYSTEM OF ELECTRICAL DISTRIBUTION.
APPLICATION FILED FEB. 26, 1913.
1,080,355.
Patented Dec. 2, 1913.
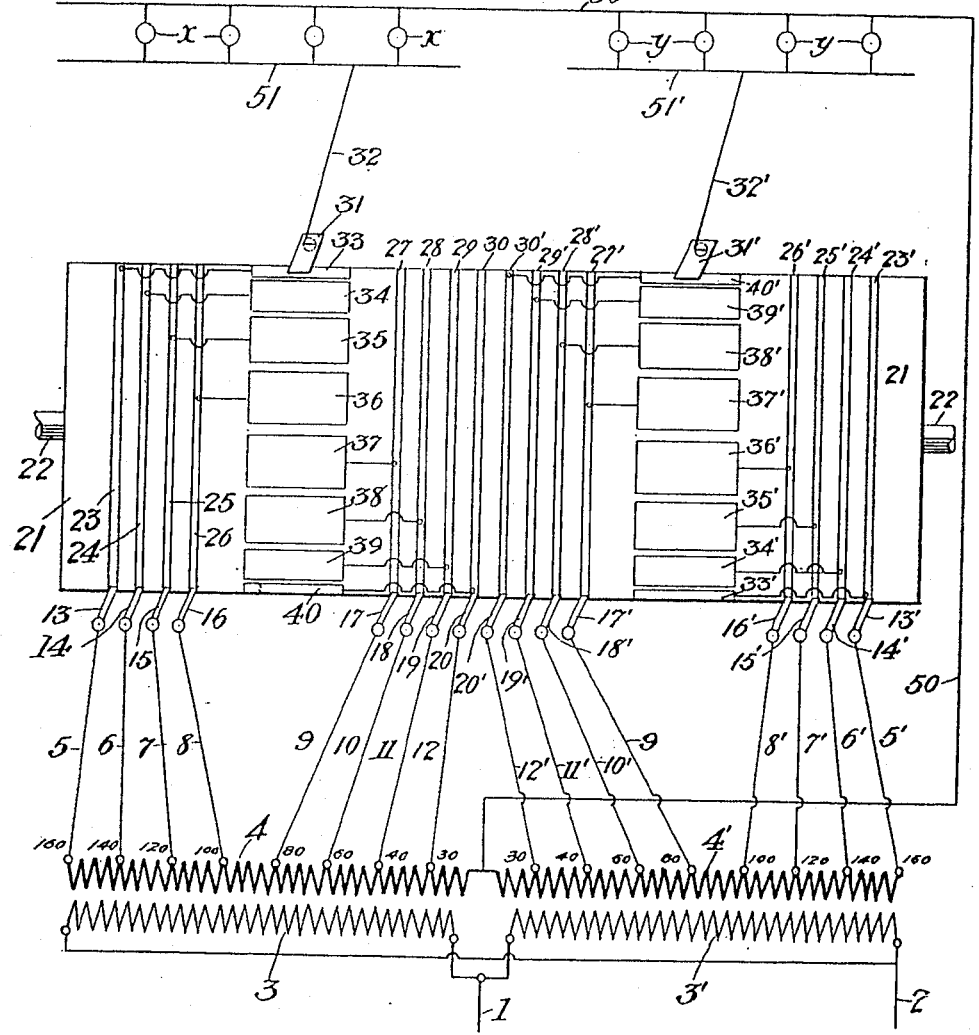
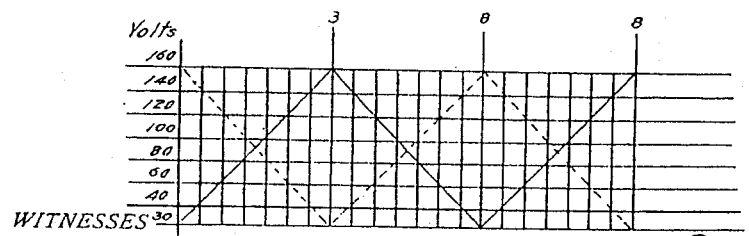

UNITED STATES PATENT OFFICE.

JOSEPH O. LUTHY, OF SAN ANTONIO, TEXAS.

SYSTEM OF ELECTRICAL DISTRIBUTION.

1,080,355.   Specification of Letters Patent.   Patented Dec. 2, 1913.

Application filed February 26, 1913. Serial No. 750,860.

*To all whom it may concern:*

Be it known that I, JOSEPH O. LUTHY, a citizen of the Republic of Switzerland, residing at San Antonio, county of Bexar, State of Texas, have invented certain new and useful Improvements in Systems of Electrical Distribution; and I do hereby declare the following to be a full, clear, and exact description of the invention, such as will enable others skilled in the art to which it appertains to make and use the same.

The invention relates to systems of electrical distribution wherein the electrical energy is supplied to a circuit or circuits, which include translating devices, initially at a voltage in excess of that for which the translating devices are designed, in such manner as to produce a maximum efficiency in the translating devices and at the same time to effect a material saving of electrical energy so that the translating devices, such as incandescent lights, or the like, may be maintained at the normal rate of operation, viz. luminosity in the case of electric lights, under conditions of materially reduced current consumption.

To this end, the invention involves the supplying of an electrical circuit or circuits, including the translating devices, with current of successively varying voltages between a given maximum and minimum, to wit from a maximum to a minimum voltage and vice versa, and rapidly reversing the order of the voltage variation in the circuit, so that while the average voltage during one period of variation, either increasing or decreasing, is below the voltage required by the translating devices when operating under normal conditions of uniform voltage, the conjoint effect of the abnormally high voltage on the one hand, and the abnormally low voltage on the other, will produce the desired normal effect or result in the translating devices with a material saving or economy in the watt consumption of electrical energy by the translating devices.

While the invention is applicable to a single circuit containing a number of translating devices, a more economical result is attained when it is applied to two circuits, or an even number of plural circuits equally divided, so that while the voltage is being successively diminished in one circuit or series of circuits, it is being simultaneously increased proportionately in the other corresponding circuit or series of circuits, thereby imposing an even distribution of the load on the generating plant at all times and admitting of the rapid reversing of the order of increase and decrease in the respective circuits or sets of circuits without causing any fluctuation in the total load.

The invention is capable of successful application with currents of any character, either alternating or direct, and supplied by any of the ordinary sources of generation, and the particular embodiment of the invention illustrated in the accompaning drawings is to be regarded as exemplary only and in no sense limiting.

In said drawings, Figure 1 is a diagrammatic view of two incandescent light circuits supplied from an alternating current source by means of transformer apparatus, involving a special form of current distributing apparatus within contemplation of the invention. Fig. 2 is a diagram illustrating the typical voltage variation in the respective circuits.

The invention will first be described with reference to its application by means of the apparatus illustrated, which, as indicated, is to be regarded as exemplary merely, of one device for carrying out the generic method of distribution involved.

Referring to the drawings, the numerals 1 and 2 represent the leads of an ordinary alternating current circuit which are connected in parallel with the primaries 3, 3' of two transformers, the secondaries of which are indicated by the numerals 4, 4'. One terminal of each of said secondaries is connected with a common lead 50 to which are connected one terminal of each of the several translating devices, illustrating in the drawings as two banks of incandescent electric lights $x$ and $y$. The secondary of each of the transformers is subdivided into sections by means of leads or taps so disposed that current varying in voltage say from 160 as a maximum to 30 as a minimum may be taken off as desired. The secondary 4 is designed to supply the current to the bank of lamps $x$, and similarly the secondary 4' suppiles the bank of lamps $y$, the order of supplying the respective banks being such that while secondary 4 is delivering a voltage which rapidly decreases from the maximum of 160 volts to 30 volts to the bank of lamps $x$, the secondary 4' is simultaneously delivering to the bank of lamps $y$, a current the voltage of which correspondingly varies from the minimum of 30 volts to the maximum of 160 volts, and this order of variation in increase and decrease of voltage in the respective circuits, is rapidly reversed so that while the voltage is being diminished in one bank between the extremes indicated, the voltage in the other bank of lights is being proportionately and simultaneously augmented. This action is effected by means of a rapidly rotated distributing drum 21 which is provided with two sets of slip rings 23 to 30 and 23' to 30' respectively, which are engaged by corresponding sets of brushes 13 to 20 and 13' to 20' respectively, the brushes 13 to 20 being connected to the terminals of the sections of secondary 4 of the left-hand transformer by means of leads 5 to 12 inclusive and the brushes 13' to 20' being correspondingly connected to the terminals of the sections of the secondary 4' of the right-hand transformer by leads 5' to 12' respectively. The slip rings and their associated brushes may be applied to the surface of the drum 21 in any desired arrangement, but the arrangement shown in the drawings has been found to be both efficient and economical. The surface of the drum is likewise provided with a series of separate contacts for each series of slip rings, arranged generally like the commutator bars of a generator. As illustrated, there are two series of circumferentially arranged conductor segments or bars, each series consisting of fourteen bars or segments, eight of which are indicated in each set, those to the left of the mid-section of the drum being indicated by reference numerals 33 to 40 inclusive, while those to the right are indicated by reference numerals 33' to 40' inclusive. Each of the segments 33, 34, 35, etc., is connected by a suitable lead to one of the slip rings 23, 24, 25, etc., and simultaneously, each of the segments 33', 34', 35', etc., is connected to a corresponding slip ring 23', 24', 25', etc. Coöperating with the respective series of segments are brushes 31 and 31', the former of which is connected by a lead 32 to a common lead 51 to which the other terminals of the translating devices $x$ are connected, and the latter of which brushes 31' is connected by a lead 32' with the corresponding lead 51' from the other bank of translating devices $y$.

The operation of the apparatus as described is as follows: The drum 21 is rotated at a high rate of speed by means of suitable motive power applied to shaft 22 thereof, which causes the commutator segments to pass rapidly into and out of contact with the stationary brushes 31 and 31' and thereby cause said brushes to deliver to the translating devices in the two circuits, current which rapidly varies in voltage between the upper limit of 160 volts and the lower limit of 30 volts, and vice versa, the order of the voltage variations being opposite in the two circuits, namely, while the voltage in the circuit supplying the lights $x$ is diminishing successively from the maximum to the minimum, that in the circuit supplying lights $y$ is correspondingly increasing from the minimum 30 to the maximum 160. In the position of the parts shown in the drawings, the bank of lights $x$ is receiving current at 160 volts from the whole transformer secondary 4 by way of lead 5, brush 13, slip ring 23, commutator segment 33, brush 31, lead 32, conductor 51 through the lamps $x$ in parallel, common conductor 50, back to the other terminal of the transformer secondary 4. At the same time, the bank of lights $y$ is receiving current of 30 volts from the first section of the transformer 4' by way of lead 12', brush 20', slip ring 30', commutator segment 40', brush 31', lead 32', conductor 51', through the lights $y$ in parallel, thence by way of common conductor 50 back to the other terminal of secondary 4'. When the commutator segment 34 passes under brush 33, the current having a voltage of 140 will be delivered to the bank of lamps $x$ by way of lead 6, brush 14, slip ring 24, commutator segment 34, brush 31, etc., and at the same time, the leads $y$ will receive current at 40 volts from the secondary 4' by way of lead 11', brush 19', slip ring 29', commutator segment 39', brush 31', etc. Similarly as the successive segments on the respective ends of the drum pass under the brushes 31 and 31', the voltage of the current supplied to the bank of lamps $x$ will be successively diminished from 120 to 30 volts, while the current supplied to the bank of lamps $y$ will be successively and correspondingly increased from 60 volts to 160 volts. When the drum has made one-half revolution, the variation of the voltage in the two banks of lights will have passed through the normal cycle designed for the particular machine, namely from 160 volts to 30 volts in the bank $x$ and from 30 volts to 160 volts in the bank $y$, and while the drum 20 is traveling through the second half of the complete revolution, the order of the voltage variation will be reversed with respect to the two banks of lamps, that is to say, the voltage delivered from the secondary 4' to the bank of lamps $y$ will be successively diminished from 160 to 30 while that developed from the secondary 4 to the bank of lamps $x$ will be simultaneously and successively increased from 30 to 160. As this successive variation and regular reversal of the order of variation is effected with great rapidity due to the speed of rotation of the drum 21, the two banks of lights will be maintained at a steady degree of incandescence quite as effectively as if they were supplied by a current of steady and uniform voltage, but at a watt consumption per lamp much lower than is possible if the same circuits were supplied by a current of uniform voltage, the saving in current in some instances amounting to at least 25 per cent. with the lamps burning steadily at their normal degree of incandescence. For example, with the type of apparatus illustrated in the drawings, in which the transformers deliver a current varying in voltage from 160 as a maximum to a minimum of 30, the lamps employed are of the ordinary standard 110 volt type and have been successfully operated without any unsteadiness or flickering and at their normal illuminating power under a current consumption 25 per cent. less than that required by the same number of lamps when supplied by a current having a steady and normal voltage of 110.

It will be understood, of course, that the voltage limits indicated, as well as the character and capacity of the translating devices are merely exemplary and may be varied to meet the varying conditions of commercial operation. For example, the voltage impressed upon the circuits of the translating devices might be varied from the desired maximum to zero and vice versa, but when lamps or similar translating devices are employed, it is found desirable to maintain some voltage on the circuit or circuits at all times. By making the successive variations in the voltage low, sparking between the brushes 31, 31' and the coöperating commutator segments is eliminated, so that the apparatus successfully obviates the serious objection to the rapid making and breaking of a commercial circuit, inasmuch as the highest voltage that can be developed under the brushes will not exceed that represented by the difference between the voltages of adjacent commutator segments, which, in the exemplification shown, is never more than 20 volts.

While the invention, in both its aspects as a method and an apparatus or system for applying said method, has been illustrated and described as involving an alternating current source and one or more transformers, it will be understood that the invention is not limited in this respect, but is equally applicable to a direct current source, such for example, as a direct current dynamo electric generator, a series of primary, or secondary electric cells associated with means for successively and regularly varying the voltage of the current delivered between any predetermined limits and reversing the order of the voltage variation between the respective circuits of the translating devices. In the case of a dynamo electric machine, the result may be attained by successively cutting in and out graduated, varying resistances, preferably lights or other translating devices, so that the voltage delivered to the ultimate consumption circuit or circuits will vary accordingly, and in the case of a battery, the cells or elements thereof may be cut in and out of the circuit or circuits successively and to the same end, but inasmuch as such arrangements and dispositions of the necessary apparatus to effect the desired result will be apparent to those skilled in the art, in view of the foregoing description, it is not deemed necessary to illustrate other forms of apparatus for carrying out the invention.

A further advantage of the method as described, involving the successive variation of the voltage between a given maximum and minimum, admits of the invention being applied to step down or reduce a current, especially of the direct type, to a lower effective voltage. For example, if an apparatus of the kind indicated were employed with an initial voltage of 1,000 and this voltage were successively reduced to 250, the average voltage delivered to the translating devices would be 625, which would effect an operation of the translating devices under the conditions of economy hereinbefore indicated, and because of the extremely rapid variations in the voltage, no injury to the translating devices would result from the high initial voltage, because the latter would not be maintained, under any conditions, for any more than the briefest interval of time.

What I claim is:—

1. The method of distributing electrical energy to translating devices, which consists in supplying said devices with current, the voltage of which is in excess of that normally required by said translating devices, successively varying said voltage between predetermined limits, and rapidly reversing the order of the voltage variation.

2. The method of distributing electrical energy to a plurality of translating-device circuits, which consists in supplying said circuits with current, successively decreasing the voltage in one of said circuits and simultaneously and proportionately increasing the voltage in the other of said circuits, and rapidly reversing the order of voltage variation in the respective circuits.

3. The method of distributing electrical energy to a plurality of translating-device circuits, which consists in supplying said circuits with current, the maximum voltage of which is in excess of that required by the translating devices, successively decreasing the voltage in one of said circuits and simultaneously and correspondingly increasing the voltage in the other circuit, and rapidly reversing the order of voltage variation in the respective circuits.

4. Apparatus for distributing electrical energy to a plurality of translating-device circuits, comprising a source of supply, and mechanism interposed between said source and said circuits for successively and inversely varying the voltage in the respective circuits, said mechanism including means for rapidly reversing the order of voltage variation in said circuits.

In testimony whereof I affix my signature, in presence of two witnesses.

JOSEPH O. LUTHY.

Witnesses:
ARTHUR L. BRYANT,
CHAS. J. O'NIELL.

Copies of this patent may be obtained for five cents each, by addressing the "Commissioner of Patents, Washington, D. C."